(12) United States Patent
Herndon

(10) Patent No.: US 6,272,425 B1
(45) Date of Patent: Aug. 7, 2001

(54) LOAD DETERMINATION FOR AN INTERNAL COMBUSTION ENGINE

(75) Inventor: James A. Herndon, Cass City, MI (US)

(73) Assignee: Walbro Corporation, Cass City, MI (US)

( * ) Notice: Subject to any disclaimer, the term of this patent is extended or adjusted under 35 U.S.C. 154(b) by 0 days.

(21) Appl. No.: 09/313,504

(22) Filed: May 17, 1999

(51) Int. Cl.[7] .............................. F02P 5/00; G06F 17/00
(52) U.S. Cl. .................... 701/105; 701/102; 701/110; 123/436; 123/406.24; 337/19
(58) Field of Search .................................. 701/105, 101, 701/102, 110; 123/480, 478, 436, 406.24, 406.25; 73/117.3; 377/16, 17, 19, 20

(56) References Cited

U.S. PATENT DOCUMENTS

| | | | |
|---|---|---|---|
| 3,870,869 | * 3/1975 | Eberle et al. | 377/17 |
| 4,291,383 | * 9/1981 | Tedeschi et al. | 701/102 |
| 4,301,678 | * 11/1981 | Full et al. | 73/116 |
| 4,483,184 | * 11/1984 | Kunzfeld | 73/117.2 |
| 4,532,592 | * 7/1985 | Citron et al. | 701/105 |
| 4,697,561 | * 10/1987 | Citron | 123/436 |
| 4,924,831 | 5/1990 | Piteo et al. . | |
| 5,345,817 | * 9/1994 | Grenn et al. | 73/117.3 |
| 5,392,753 | 2/1995 | Burson et al. . | |
| 5,577,475 | * 11/1996 | Backer et al. | 123/479 |
| 5,988,140 | 11/1999 | Gartner et al. | 123/406.24 |

OTHER PUBLICATIONS

Development of a Low–Cost Fuel Injection System for Use on Small Utility Engines, SAE 1999–01–3292/JSAE 9938047, pp. 360–367, Paul M. Gartner, Copyright 1999 Society of Automotive Engineers, Inc.

* cited by examiner

Primary Examiner—Henry C. Yuen
Assistant Examiner—Hieu T. Vo
(74) Attorney, Agent, or Firm—Reising, Ethington, Barnes, Kisselle, Learman & McCulloch, P.C.

(57) ABSTRACT

A method and apparatus are provided for synchronizing an event of an internal combustion engine at least in part as a function of the load on the engine. Desirably, the ignition timing of the engine may be controlled as a function of the load on the engine. Preferably, the system and apparatus utilize existing engine sensors to provide the information needed to determine the load on the engine. Also preferably, the system and apparatus provide the load determination to other systems such as a fuel injection system to improve the timing of the injection event of the system.

27 Claims, 4 Drawing Sheets

LOAD DETERMINATION FOR AN INTERNAL COMBUSTION ENGINE

FIELD OF THE INVENTION

This invention relates to internal combustion engines generally, and more particularly, to a method and apparatus for providing a determination of load on internal combustion engines to improve control over engine operational parameters.

BACKGROUND OF THE INVENTION

In internal combustion engines it is desirable to schedule various operational parameters of the engine as a function both of the engine speed and the engine load. Determination of engine speed or revolutions per minute (RPM) is well established for internal combustion engines. Prior digital systems determining the timing of engine spark ignition as a function of engine speed (RPM) are disclosed in U.S. Pat. Nos. 5,392,753 and 4,924,831.

However, to date, there has been no economical method of determining the load on a small internal combustion engine. The conventional methods of determining engine torque involve measuring strain or angular displacement of a segment of the crankshaft, a mounting element or an element of the drive train. These methods are not cost effective for small engine applications. Therefore. small engines have used fuel injection event and/or ignition timing that is either fixed or based on the engine speed.

SUMMARY OF THE INVENTION

A method and apparatus are provided for synchronizing spark ignition and/or other events of an internal combustion engine as a function of the engine speed and the load on the engine. Desirably, the system and apparatus utilize existing engine sensors, preferably from a conventional magneto-type capacitor discharge ignition system, to provide the information needed to determine the load on the engine. It is therefore an object of the present invention to provide a low cost ignition system wherein at least the ignition timing is scheduled as a function of both the engine speed and the load on the engine. To that end, an electronic circuit is provided for determining the load on an internal combustion engine, preferably using information that is already available to the ignition system from various sensors.

Objects, features and advantages of this invention include providing a system and apparatus for determining the load on an engine and synchronizing engine events as a function of engine load, which may utilize existing engine sensors, may not require additional sensors to be added to the engine, is adaptable to various engines having one or multiple cylinders, can be used with two-stroke or four-stroke engines, permits improved control of the engine ignition timing as a function of engine load as well as other engine parameters, reduces exhaust emissions, improves engine performance, can provide the engine load information to other systems to improve control of those systems, is of very low cost and economical manufacture and assembly and in service has a long useful life.

BRIEF DESCRIPTION OF THE DRAWINGS

These and other objects, features and advantages of this invention will be apparent from the following detailed description of the preferred embodiments and best mode, appended claims and accompanying drawings in which:

DETAILED DESCRIPTION OF THE PREFERRED EMBODIMENTS

Figure 1:
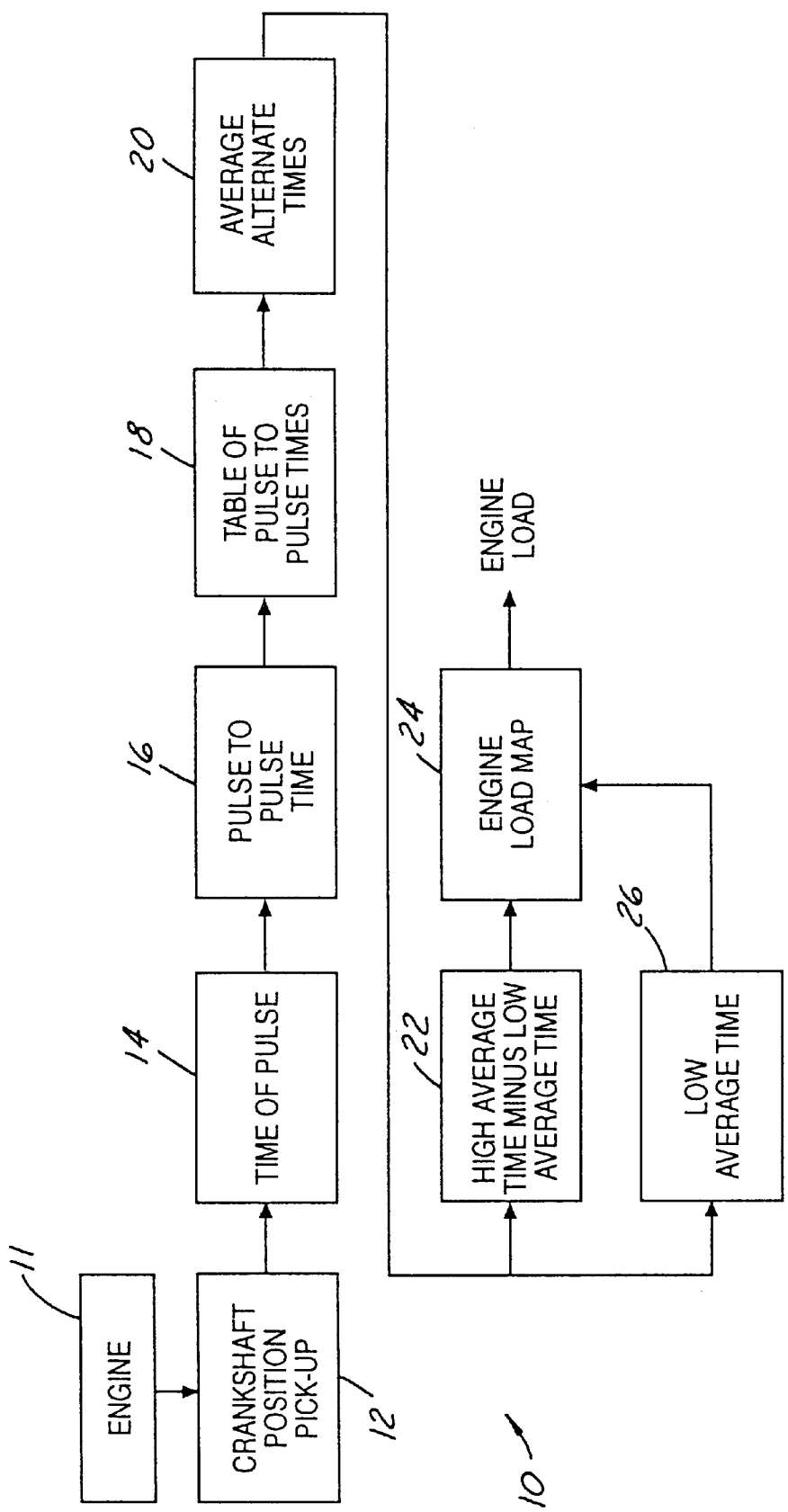
FIG. 1 is a block diagram of the operation of the present invention.
Figure 4:
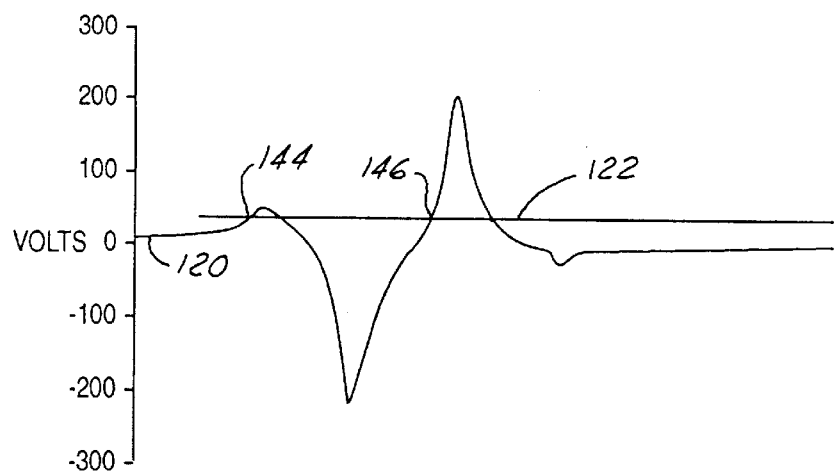
FIG. 4 is a plot of an ignition waveform such as may be generated in a two-stroke engine capacitor discharge ignition system.
Figure 5:
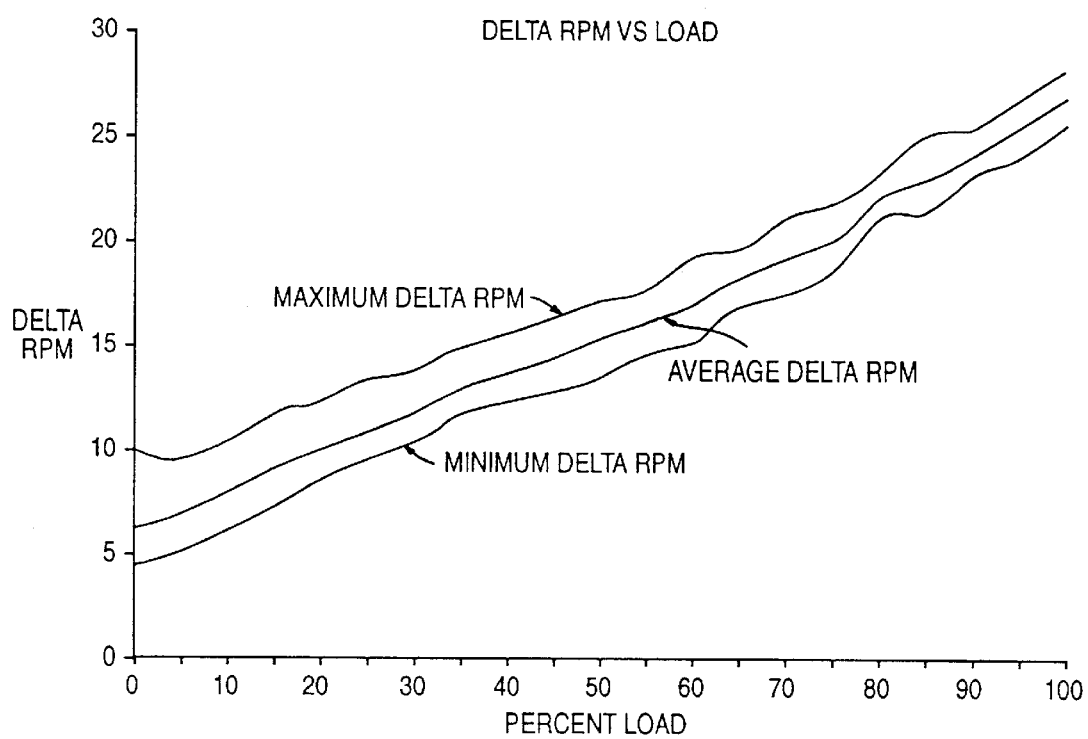
FIG. 5 is a plot of the RPM vs. load in a typical engine.

Referring in more detail to the drawings, FIG. 1 diagrammatically illustrates a system 10 and method in which the load on an internal combustion engine 11 is determined to improve control over at least the ignition event within the engine 11. The system 10 and method utilize changes in the speed of rotation of a body driven by the engine, such as a crankshaft or flywheel, corresponding to different portions of the engine cycle to determine the load on the engine or piston and thereafter to use such load information as a parameter to improve control of the timing of at least the ignition event and preferably also the fuel injection event or other engine events. Generally, the system and method comprise determining the crankshaft position based on pulses received from a sensor, calculating the time between pulses and/or pulse durations and thereafter determining the maximum and minimum angular velocities of the crankshaft during an engine cycle which is proportional to the engine load. A representative graph correlating the difference in RPM or engine speed between portions of the engine cycle and the load on the engine is shown in FIG. 4. Preferably, the sensors are located where the maximum and minimum speeds of rotation of the crankshaft occur.

With a four-stroke engine, a single sensor location may be used with the time between consecutive pulses relating to a full revolution of the crankshaft which is one-half of the engine cycle. In a four-stroke engine, the revolution containing the power stroke is faster, or in other words, at a higher rpm than the revolution containing the compression stroke. This difference between the time of the revolution containing the power stroke and that of the compression stroke is a function of the load on the engine. The greater the difference between these times, the greater the load on the engine. Further, the ignition spark can be controlled to synchronize the ignition to the compression stroke to avoid an unnecessary spark during the exhaust stroke.

FIG. 1 generally illustrates a system to carry out the method of the invention by receiving and storing the relative time between pulses from a crankshaft or flywheel position sensor and thereafter performing various calculations to average the information received over a plurality of cycles to more accurately determine the average load on the engine which is used to improve control over, for example, the fuel injection and ignition events. In more detail, the system shown in FIG. I has a crankshaft position pickup block 12 (preferably edge 66 FIG. 3B), a time of pulse block 14, a pulse-to-pulse time block 16, a table of pulse-to-pulse times 18, an average alternate time block 20, a high time average minus low time average block 22, an engine load map block 24 and a low average block 26.

The time of pulse block 14 calculates the time of a pulse received from an electronic pickup positioned on the crankshaft of the engine. The time is generally captured and saved for use in determining the elapsed time between pulses. The pulse to pulse time block 16 calculates the elapsed time between pulses which is generally the time per revolution for a one pulse per revolution pickup. The table of pulse to pulse times 18 is generally a two dimensional array which maintains the most recent pulse to pulse elapsed times. The table 18 is generally a first-in, first-out (FIFO) device where the oldest time is overwritten when a new time is received.

The average alternate time block 20 calculates the average of each dimension of the two dimensions in the table 18 following the addition of a reading of the longer time dimension of the array. The longer time dimension of the array contains the non-power stroke revolution information for the particular cycle. This timing information provides the synchronization to separate the revolution containing the power or combustion stroke of an engine piston (i.e., faster revolutions) from the revolution containing the compression stroke of the engine piston. This synchronization generally assures that the averages do not include unrelated information from the starting and ending revolutions. Further, to determine the energy dissipated from the energy input of a power stroke, which is a function of the load on the engine, the revolution containing a power stroke is compared to the succeeding non-power stroke revolution and not the preceding revolution.

The high average minus low average block 22 calculates the difference between the averages from the block 20 as a function of the average load. The output of the block 22 is one of the two general elements required to determine the engine load at a particular time. A low average is the other general element required to determine engine load.

The engine load map block 24 generally relates the difference between the time for the power revolution and the following non-power revolution of a typical four stroke engine cycle and the time for one of the revolutions in the cycle. The load map block 24 may be implemented in various forms such as a table, an interpolated table or an equation. An alternate implementation of the calculations may be determined using RPM differences and RPMs rather than the time differences.

Figure 2:
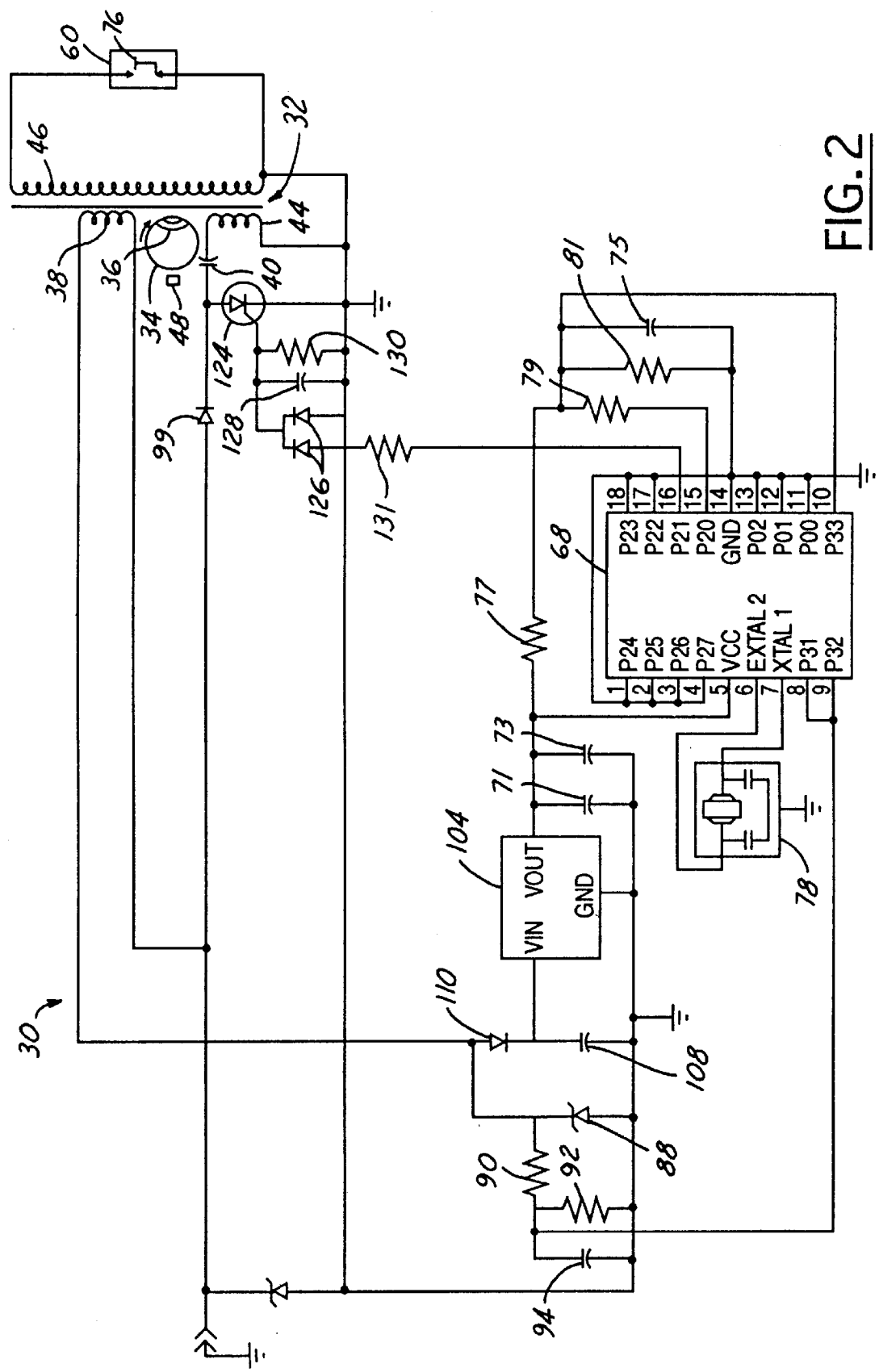
FIG. 2 is a circuit diagram of the present invention.

As shown in FIG. 2, a circuit 30 of a capacitor discharge engine ignition system in accordance with a presently preferred embodiment of the invention has an ignition coil 32 with a primary winding 44 and a secondary winding 46 coupled to a spark plug 60 for initiating ignition in an engine. A flywheel 34 is suitably coupled to the engine crankshaft, and carries at least one magnet 36 that rotates in synchronism with the crankshaft. A coil assembly 32 is disposed for coupling with magnet 36 as flywheel 34 rotates for generating signals (FIG. 3A) in the coil assembly. Coil assembly 32 includes a charge coil section 38 that is connected through a diode 99 and capacitor 40 to primary winding 44 of ignition coil 32. A timing signal conditioner and a microcontroller power supply are connected at one end to charge coil 38. The microcontroller power supply consists of diode 110 which rectifies the current charge into capacitor 108 providing unregulated voltage to voltage regulator 104 which in turn provides regulated power to microcontroller 68. Ceramic resonator 78 provides a clock signal, which is the precision timing control for the microcontroller. Zener Diode 88 and resistive divider composed of resistors 90 and 92 along with filter capacitor 94 provide timing signals to microcontroller 68. Capacitors 71 and 73 provide filtering of the regulated voltage to microcontroller 68. The divider composed of resistors 77 and 81 and filter capacitor 75 provide a threshold reference through protective resistor 79 to P20 of microcontroller 68. The threshold reference is applied to the signals on P31 and P32 of microcontroller 68.

An electronic switch, preferably in the form of an SCR 124, has a primary current conduction anode and cathode electrodes respectively connected to the junction of diode 99 and capacitor 40. SCR 124 has a control or gate electrode that is operatively connected to the microcontroller 68 through diode 126 and resistor 131. Diode 126, capacitor 128 and resistor 130 serve to protect the gate of SCR 124 and prevent false triggering of SCR 124. Microcontroller 68 controls the triggering of SCR 124.

Figure 3A:
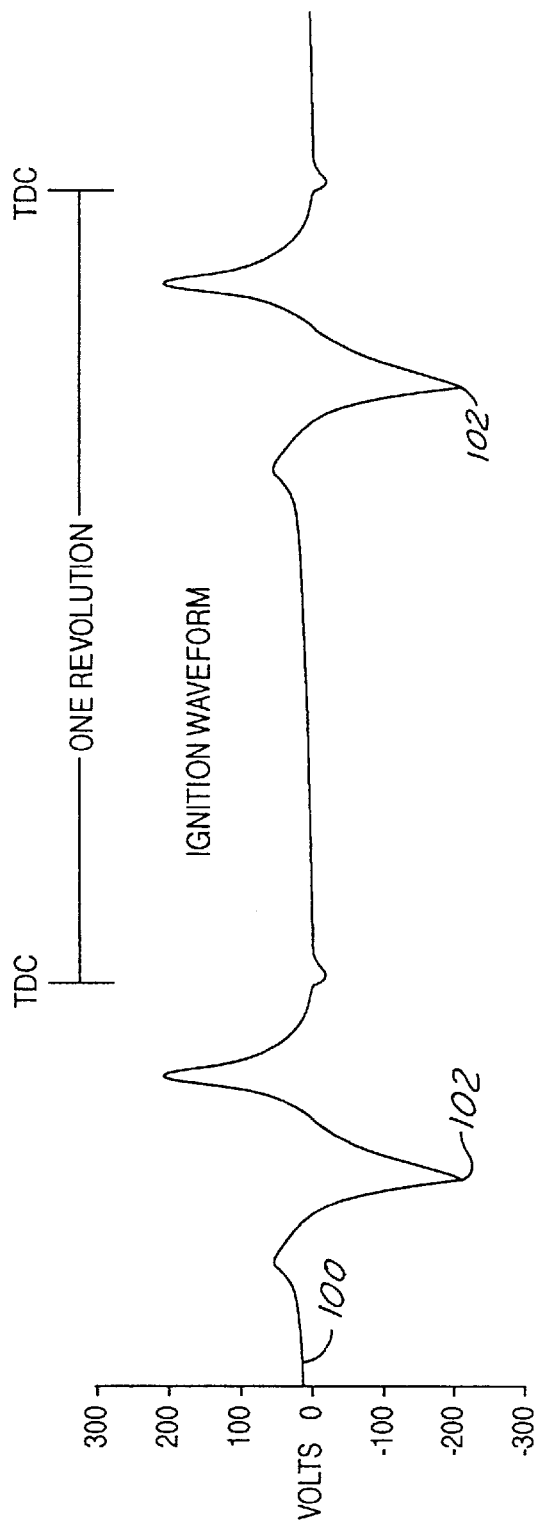
FIG. 3A is a plot of ignition waveforms such as may be generated in a charge coil of a magneto-type capacitor discharge ignition system.
Figure 3B:
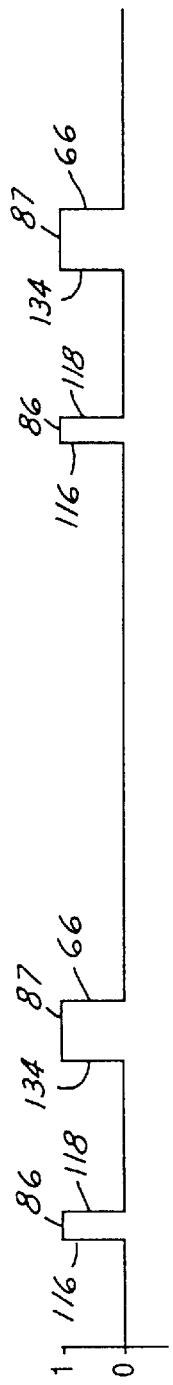
FIG. 3B is a plot of the waveforms of FIG. 3A as interpreted by a microcontroller.

Upon each rotation of magnet 36 past coil 38 there is generated in coil 38 a signal as illustrated in FIG. 3A. The signal applied through diode 99 charges capacitor 40 to provide the energy to generate the spark across the spark gap 76. When the SCR 124 is triggered by a signal from the microcontroller 68, the resulting conduction of SCR 124 applies the voltage of capacitor 40 across the primary coil 44 of the transformer of ignition coil 32 generating the high voltage across the transformer secondary coil 46 providing the spark energy to fire the spark plug 60. FIG. 3B shows the conditioned signal from the charge coil 38 as applied to the microprocessor 68.

The duration of conditioned signal pulses 86 and 87 and the specific location of the edges 116, 118, 134 and 66 relative to the crankshaft angle are a function of rotational speed of the crankshaft. These edges provide the information to the microcontroller 68 required to schedule the occurrence of the ignition spark.

To the extent thus far described the ignition system is of generally conventional construction and operation for a digitally controlled ignition. In accordance with the present invention the preferred embodiment can be incorporated into this circuit and system. The engine load is determined by processing the information input to the ignition system to obtain the engine load. In an internal combustion engine the angular velocity of the crankshaft changes through an engine cycle. Information derived from the variation in crankshaft angular velocity can be used to determine engine load on most single cylinder engines and some multiple cylinder engines.

The load on a single cylinder four stroke engine can be determined by measuring the time between consecutive engine revolutions starting with the beginning of the combustion stroke. Because all of the energy input occurs in the combustion stroke, the elapsed time of the revolution containing the combustion and exhaust strokes is shorter (i.e. at a higher RPM) than the time for the following revolution containing the intake and compression strokes (which is at a lower RPM). Edge 66 of pulse 87 occurs close enough to top dead center (the ideal location) so that it may be used to determine the time for the consecutive revolutions used to determine engine load. The microcontroller 68 determines the time between consecutive edges 66, which represents one engine revolution, and the differences between the times of the revolution containing the combustion stroke and the following revolution containing the compression stroke. The engine load is a function of the difference between the time for a revolution containing the combustion stroke and the time for the following revolution containing the compression stroke.

Alternatively, a level sensitive signal detector may be used which samples the ignition waveform 100 of FIG. 3A when the waveform 100 crosses or reaches a distinctive point or threshold, such as at spike 102, which occurs once every engine revolution. The time between consecutive occurrences of spikes 102 is the time for one engine revolution. In this way, the various engine revolutions may be measured, differentiated and used to determine engine load.

Generally, in a single cylinder four stroke engine, every other engine revolution contains a combustion stroke. The revolution beginning with the combustion stroke is faster than the subsequent revolution. As a result, the particular order of the revolutions may be determined without the use of additional inputs. In specific applications, a signal may be available from a cam that may be used to provide an immediate and positive distinction between the load and exhaust revolutions. However, in other applications where a cam sensor is not available a positive distinction between the load and exhaust revolutions can readily be determined by the difference in time for the revolutions of a cycle.

For each engine cycle (e.g. two crankshaft revolutions for a 4-stroke engine) the microprocessor 68 subtracts the calculated time of the particular revolution which contains the compression stroke from the calculated time of the revolution containing the combustion stroke. The difference in these times corresponds to the difference in speed of the two crankshaft revolutions in the cycle. The microprocessor 68 calculates the engine load by using one of the time values calculated and the time difference calculated between the two crankshaft revolutions of a cycle and compares it with the values stored in the table 18. Finally, the microprocessor 68 may then present signals that may be used for external purposes such as driving a display, controlling timing of the engine ignition and/or fuel injection events, controlling the fuel to air mixture of the engine, the exhaust emissions or any other purpose necessary for a particular application.

The circuit 30, while configured generally for a 4-stroke engine, may be used with a 2-stroke engine with minor modifications. In a 2-stroke engine, there is a combustion or power stroke for each crankshaft revolution. Therefore, to enable determination of the 2-strokes per crankshaft revolution in a 2-stroke engine, a signal must be obtained at two separate points per crankshaft revolution. The time between consecutive signals from one point corresponds to the engine speed over one crankshaft revolution. The time between signals from one point in the crankshaft revolution to a second point corresponds to the engine speed over the angle of crankshaft rotation between the two points.

To determine the load on a two-stroke engine, in one cycle of the engine the time between consecutive signals from the same point (i.e., the time for one complete crankshaft revolution) and the time between pulses from that point to the second point are measured. Generally, the average difference in the two times is a function of the load on the engine. However, due to typical cycle variations in the engine operation, it is desirable and may be necessary to average the information obtained over several engine cycles. To generate two signals for each crankshaft revolution, different portions of pulse 87 may be used. The time per revolution (one engine cycle) may be measured from one edge 66 of pulse 87 to the next occurrence of the same edge 66 of a subsequent pulse 87. The angular rate at the end of the engine cycle or revolution is a function of the time between edges 134 and 66 of pulse 87. The engine load is a function of the time per revolution and the pulse width 87 (time between edge 134 and edge 66).

Alternatively, to generate two signals for every crankshaft revolution in a 2-stroke engine, a level sensitive signal detection can be used to generate pulses when an input signal, such as the ignition waveform 120 shown in FIG. 4, reaches a predetermined threshold 122, as indicated by points 144 and 146 in FIG. 4. This ignition waveform is typical of that generated in a charge coil of a typical magneto-type CDI system of a two stroke engine over one crankshaft revolution.

Specifically, the signal conditioner would be modified to generate two pulses per crankshaft revolution. The two pulses would be generated using a level sensitive signal detector when the voltage of the waveform exceeds the positive threshold 122. A first capture point 144 is realized when the waveform 120 crosses the threshold 122. A second capture point 146 is realized when the waveform 120 exceeds the threshold 122 for a second time. The microcontroller 68 captures the time of occurrence of each of the capture points 144 and 146. The time difference between consecutive occurrences of the same capture point 144 or 146 is the time for one complete crankshaft revolution. The time between adjacent pulses (i.e., the capture point 144 and the capture point 146) relative to the time per revolution is a function of the engine load.

Alternatively, to provide signals from two points for every crankshaft revolution in a 2-stroke engine, a second sensor 48 (FIG. 2) could be provided spaced a known distance from an existing engine sensor. With a typical capacitor discharge ignition (CDI) system, the first sensor is preferably the existing charge coil in which an electrical signal is generated when a magnet 36 on the flywheel 34 is rotated past the charge coil. Similarly, the second sensor 48 could be implemented as a coil spaced from the charge coil and disposed adjacent to the flywheel 34. Each passing of the flywheel magnet 36 past this coil would generate an electrical current or signal in the coil which would be sensed by the microcontroller 68. Alternatively, the first sensor may be some other existing engine sensor and the second sensor may be substantially any other type of sensor capable of determining a particular angular position of the flywheel or crankshaft. Preferably, the two sensors are equally angularly spaced. However, if necessary, unequally spaced sensors may be used.

Often, a particular application may require some form of filtering of engine signals to provide improved stability or enhanced performance of the engine or engine system. Additionally, the load information can be provided to other equipment or systems where this is desirable, such as to improve control over the fuel injection event or other engine event.

While the invention has been particularly shown and described with reference to the presently preferred embodiments thereof, it will be understood by those skilled in the art that various changes in form and details may be made without departing from the spirit and scope of the invention. For example the present invention may be applicable to certain multi-cylinder engines where a significant portion of the engine cycle has no combustion related power.

What is claimed is:

1. A system for improving control of an event of an internal combustion engine comprising:

an engine having a body driven for rotation by the engine and at least one of a fuel injection system, a fuel to air ratio mixture system and a spark ignition system;

a first sensor responsive to at least one angular position of the rotating body to provide a signal at least when the body rotates through said at least one angular position of the body;

an electronic circuit in communication with the sensor and determining an elapsed time of a first portion of a cycle of the engine, determining an elapsed time of a second portion of a cycle of the engine, comparing the elapsed time of the first portion of the engine cycle with the elapsed time of the second portion of the engine cycle to determine a time difference indicative of a load on the operating engine and producing an output signal to control the timing of at least one of the fuel injection, fuel to air ratio mixture, and spark ignition systems of the operating engine at least in part as a function of the time difference indicative of the load of the operating engine.

2. The system of claim 1 which also comprises a second sensor angularly spaced from the first sensor and responsive to at least a second angular position of the body to provide a signal to the electronic circuit at least at said second angular position of the body thereby providing at least two signals to the electronic circuit per rotation of the body.

3. The system of claim 2 wherein the electronic circuit determines the time between a first signal from the first sensor and the next signal from the second sensor which corresponds to less than one complete revolution of the body, and the time between said first signal from the first sensor and the next signal from the first sensor which corresponds to one complete revolution of the body to determine the load on the engine which is a function of these two times.

4. The system of claim 1 wherein the engine is a four-stroke engine and the electronic circuit has a signal conditioner that samples an engine ignition waveform, which is generated by the first sensor and corresponds to rotation of the body, once for every revolution of the body to determine the time for consecutive revolutions of the body which is a function of the load on the engine.

5. The system of claim 4 wherein the signal conditioner samples the engine ignition waveform when the signal that generates the waveform exceeds a predetermined threshold.

6. The system of claim 1 wherein the engine is a two-stroke engine and the electronic circuit has a signal conditioner which samples an engine ignition waveform, which is generated by the sensor and corresponds to rotation of the body more than once for every revolution of the body to determine the time for a given portion of a revolution of the body, and the time for the complete revolution of the body containing said given portion, with the load on the engine being a function of these times.

7. The system of claim 6 wherein the signal conditioner samples the engine ignition waveform when the signal that generates the waveform exceeds a predetermined threshold.

8. The system of claim 1 wherein the first sensor is an existing engine sensor for determining revolutions per minute of the engine and said first sensor provides one signal per revolution of the body to the electronic circuit.

9. The system of claim 1 wherein the electronic circuit output signal is used to control at least in part the ignition event in the engine.

10. The system of claim 1 wherein the electronic circuit output signal is used to control at least in part the fuel injection event of the engine.

11. The system of claim 1 which also comprises a microprocessor coupled to the electronic circuit for calculating elapsed time between consecutive signals.

12. The system of claim 1 wherein the body is one of a crankshaft of the engine and a flywheel connected for co-rotation with a crankshaft of the engine.

13. A system for improving control of an event of an internal combustion engine comprising:
an engine;
a body driven for rotation by the engine;
a first sensor responsive to at least one angular position of the rotating body to provide a signal at least when the body rotates through said at least one angular position of the body;
a second sensor angularly spaced from the first sensor and responsive to at least a second angular position of the body to provide a signal at least at said second angular position of the body; and
an electronic circuit in communication with the first and second sensors to receive at least two signals per revolution of the body for determining the time between selected signals from the sensors which time between selected signals corresponds to a load on the engine and having an output signal corresponding to the time between selected signals whereby the output signal is used to control the timing of an engine event at least in part as a function of the load on the engine.

14. A method for timing an event of an internal combustion engine comprising the steps of:
a) determining an elapsed time of a first portion of an engine cycle;
b) determining an elapsed time of a second portion of the engine cycle;
c) comparing the elapsed time of the first portion of the engine cycle with the elapsed time of the second portion of the engine cycle to determine a time difference indicative of a load on the engine;
d) determining a preferred timing for the event of the engine based on at least in part the time difference indicative of the load on the engine; and
e) providing an output signal to control the timing of the event of the engine according to said preferred timing.

15. The method according to claim 14 wherein step c) comprises:
comparing the time difference between the elapsed time determined in step a) and the elapsed time determined in step b) with a predetermined table of time differences to determine the load on the engine.

16. The method according to claim 14 wherein the engine is a four-stroke engine, the first portion of the engine cycle corresponds to one half of the engine cycle containing the power stroke and the second portion of the engine cycle corresponds to the other half of the engine cycle.

17. The method according to claim 16 wherein the time for the first portion of the engine cycle is determined by calculating the time for one complete revolution of a crankshaft of the engine during the portion of the engine cycle containing the power stroke and the time for the second portion of the engine cycle is determined by calculating the time for another revolution of the crankshaft during a different portion of the engine cycle which does not contain the power stroke.

18. The method according to claim 17 which also comprises the steps of:
providing a sensor which produces a signal when the crankshaft rotates past a particular position; and
providing a microcontroller which captures the time of occurrence of each signal from the sensor and has a microprocessor to determine the time between consecutive signals to determine the time for a revolution of the crankshaft.

19. The method according to claim 18 further comprising the step of:
providing a reference time base to said microprocessor upon which the time measurement of the occurrence of events is based.

20. The method according to claim 19 wherein said microprocessor presents an output signal to one or more external devices.

21. The method according to claim 20 wherein said output signal is used to control the ignition timing of the internal combustion engine.

22. The method according to claim 20 wherein said output signal is used to control the timing of the fuel injection event of the internal combustion engine.

23. The method according to claim 14 wherein the engine is a two-stroke engine, the first portion of the engine cycle corresponds to a predetermined portion of the engine revolution less than one complete engine revolution and containing the power stroke and the second portion of the engine cycle corresponds to one complete engine revolution.

24. The method according to claim 14 wherein said internal combustion engine comprises a single cylinder 2-stroke engine.

25. The method according to claim 14 wherein said internal combustion engine comprises a multiple cylinder 2-stroke engine.

26. The method according to claim 14 wherein said internal combustion engine comprises a single cylinder 4-stroke engine.

27. The method according to claim 14 wherein said internal combustion engine comprises a multiple cylinder 4-stroke engine.

* * * * *